United States Patent
Le Pera

(10) Patent No.: US 9,735,858 B2
(45) Date of Patent: Aug. 15, 2017

(54) METHOD FOR ESTABLISHING RADIOFREQUENCY LINKS IN A TELECOMMUNICATION NETWORK WITH AN OPTIMISED GROUND GATEWAY NETWORK

(71) Applicant: EUTELSAT S A, Paris (FR)

(72) Inventor: Alessandro Le Pera, Issy les Moulineaux (FR)

(73) Assignee: EUTELSAT S A, Paris (FR)

( * ) Notice: Subject to any disclaimer, the term of this patent is extended or adjusted under 35 U.S.C. 154(b) by 0 days.

(21) Appl. No.: 15/291,365

(22) Filed: Oct. 12, 2016

(65) Prior Publication Data

US 2017/0104521 A1 Apr. 13, 2017

(30) Foreign Application Priority Data

Oct. 12, 2015 (EP) .................................... 15189368

(51) Int. Cl.
*H04B 7/185* (2006.01)
*H04B 7/204* (2006.01)

(52) U.S. Cl.
CPC ..... *H04B 7/18515* (2013.01); *H04B 7/18513* (2013.01); *H04B 7/18517* (2013.01); *H04B 7/18523* (2013.01); *H04B 7/2041* (2013.01)

(58) Field of Classification Search
CPC ........................ H04B 7/18517; H04B 7/18523

(Continued)

(56) References Cited

U.S. PATENT DOCUMENTS 6,542,479 B1 4/2003 Boudier et al.
7,953,367 B2 * 5/2011 Bouchired ......... H04B 7/18536
455/12.1

(Continued)

FOREIGN PATENT DOCUMENTS

EP 0 987 837 A2 3/2000
EP 2 897 307 A1 7/2015

(Continued)

OTHER PUBLICATIONS

Extended European Search Report as issued in European Patent Application No. 15189368.2, dated Apr. 8, 2016.

(Continued)

*Primary Examiner* — John J Lee
(74) *Attorney, Agent, or Firm* — Pillsbury Winthrop Shaw Pittman LLP

(57) ABSTRACT

A method for establishing radiofrequency links via a satellite having several spots between a gateway and a service area comprising a plurality of elementary covering zones, designated cells, each cell being associated to a spot and including a plurality of terrestrial terminals, a forward link between the gateway towards the plurality of terrestrial terminals including a first step in which the gateway emits a first analog radiofrequency signal towards the satellite, with a first spectral efficiency; a second step in which a payload of the satellite receives the first analog radiofrequency signal; a third step in which the payload processes the first analog radiofrequency signal, and a fourth step in which the payload emits a plurality of second analog radiofrequency signals towards the cells with a second spectral efficiency, the first spectral efficiency being greater than the second spectral efficiency.

11 Claims, 3 Drawing Sheets

(58) Field of Classification Search
USPC ........ 455/3.01, 3.02, 12, 427, 428, 429, 430
See application file for complete search history.

(56) References Cited

U.S. PATENT DOCUMENTS

| | | |
|---|---|---|
| 2004/0185775 A1 | 9/2004 | Bell et al. |
| 2009/0109853 A1* | 4/2009 | Fenech .............. H04B 7/18515 370/235 |
| 2009/0227252 A1* | 9/2009 | Fenech ................... H01Q 3/26 455/429 |
| 2010/0150037 A1 | 6/2010 | Becker et al. |
| 2012/0034915 A1* | 2/2012 | Arcidiacono ...... H04B 7/18513 455/430 |
| 2012/0252356 A1 | 10/2012 | Lance et al. |

FOREIGN PATENT DOCUMENTS

| | | |
|---|---|---|
| WO | WO 99/04510 A1 | 1/1999 |
| WO | WO 2007/000794 A1 | 1/2007 |

OTHER PUBLICATIONS

Paillassa, B., et al., "Flexible satellites: Software Radio in the Sky," Telecommunications, 2003, ICT 2003, 10$^{th}$ International Conference, vol. 2, XP010638034, pp. 1596-1600.

* cited by examiner

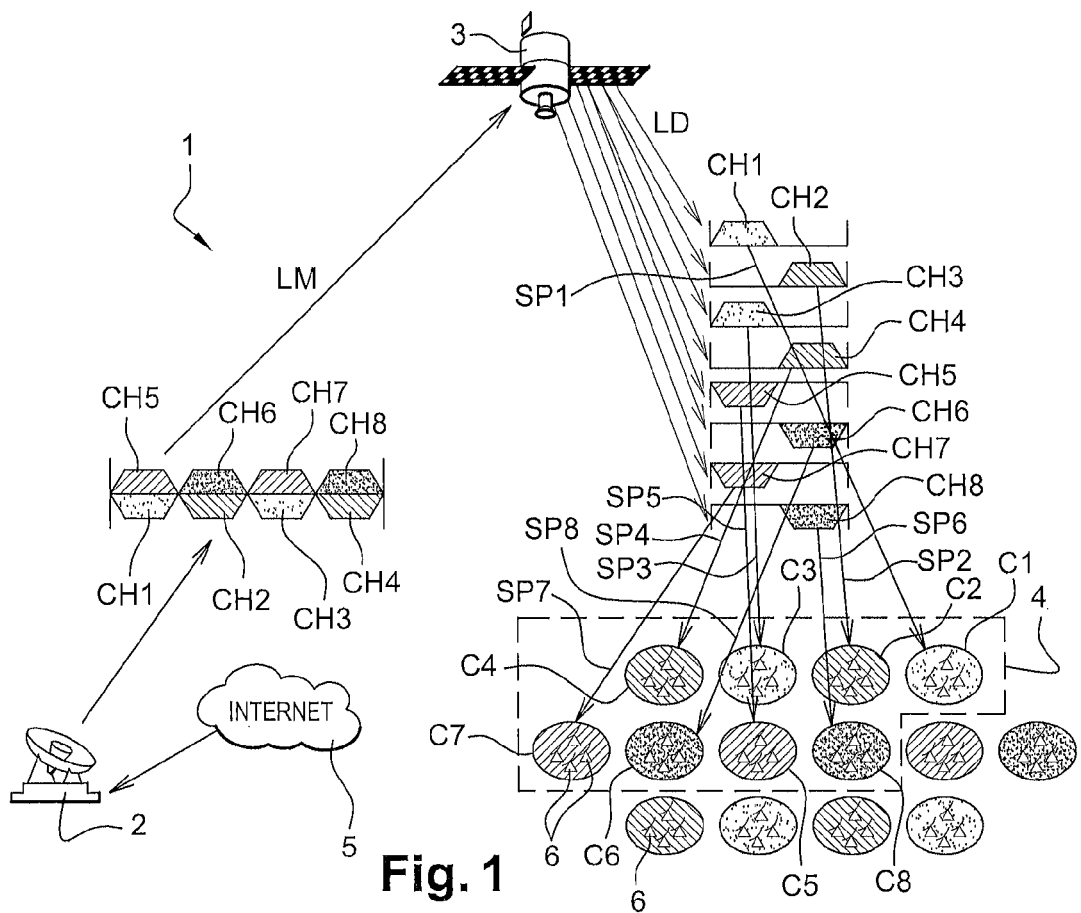
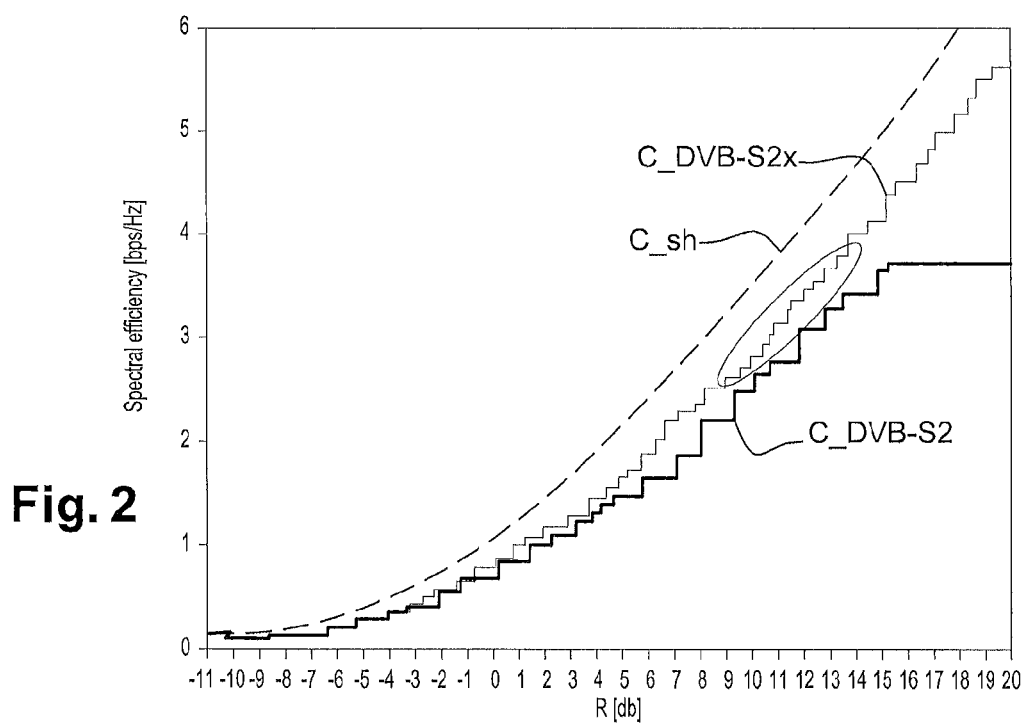
Fig. 1
Fig. 2

METHOD FOR ESTABLISHING RADIOFREQUENCY LINKS IN A TELECOMMUNICATION NETWORK WITH AN OPTIMISED GROUND GATEWAY NETWORK

CROSS REFERENCES TO RELATED APPLICATIONS

This application claims priority to European Patent Application No. 15189368.2, filed Oct. 12, 2015, the entire content of which is incorporated herein by reference in its entirety.

FIELD

The present invention relates to a method of establishing radiofrequency links in a telecommunication network with an optimised ground gateway network, and particularly in a telecommunication network comprising:
- a telecommunication satellite having several spots, designated a multispot satellite,
- at least one gateway, and
- a service area comprising a plurality of elementary covering zones, designated cells, each cell comprising a plurality of terrestrial terminals.

BACKGROUND

A multispot satellite typically has a plurality of antenna spots instead of a single broad antenna spot. Each antenna spot covers a geographical zone or cell, and the plurality of antenna spots covers a plurality of contiguous geographical zones or cells. A multispot satellite allows several radiofrequency links to be established occupying the same frequency band on different antenna spots.

In the case of a high throughput satellite (HTS) telecommunication system, the satellite is used in a bidirectional manner, i.e. at the same time for:
- relaying data emitted by a gateway towards a plurality of terrestrial terminals: this first link of the point-to-multipoint type constitutes the forward link FWD;
- relaying data emitted by the plurality of terrestrial terminals towards the gateway: this second link of the multipoint-to-point type constitutes the return link RTN.

An example of forward link FWD in a multispot configuration 1 is illustrated in FIG. 1. Radiofrequency signals are sent towards a multispot satellite 3 on an uplink LM by a gateway 2 connected to an internet backbone 5. Each of the radiofrequency signals is relayed at the level of the multispot satellite 3 and then transmitted on a downlink LD in the form of a plurality of spots. Each spot of the plurality covers an elementary covering zone, designated cell, of a plurality of cells. A plurality of terrestrial terminals is typically situated in each elementary covering zone, or cell. In the particular example of FIG. 1, the plurality of spots comprises eight spots SP1 to SP8, and the plurality of cells comprises eight cells C1 to C8. In the particular example of FIG. 1, the eight cells C1 to C8 associated respectively to the eight spots SP1 to SP8 form a group of cells served by the same gateway 2.

The return link RTN from the terrestrial terminals 6 towards the gateway 2 functions in an identical manner with an inverse direction of communication.

A HTS telecommunication system is typically focused on a bent-pipe transponder configuration, where the radiofrequency signals emitted on the uplink LM by the gateway 2 are demultiplexed and high power amplified on-board the satellite 3, and finally transmitted on the downlink LD.

The coordination of the frequencies between operators is carried out within the framework of a regulation decreed by the International Union of Telecommunications (IUT): thus, by way of example, the Ka band for Region 1 (Europe, Africa, Middle East) is defined in Table 1 below:

| | | |
|---|---|---|
| Forward link | Uplink, from the gateway towards the satellite | 27.5 GHz to 30 GHz |
| | Downlink, from the satellite towards the terrestrial terminals | 19.7 GHz to 20.2 GHz |
| Return link | Uplink, from the terrestrial terminals towards the satellite | 29.5 GHz to 30 GHz |
| | Downlink, from the satellite towards the gateway | 17.7 GHz to 19.7 GHz |

Other bands such as Ku band can likewise be used.

Configuration 1, as described in FIG. 1, uses a technique designated frequency re-use: this technique allows the same range of frequencies to be used several times in the same satellite system so as to increase the total capacity of the system without increasing the attributed bandwidth.

Frequency re-use schemes are known, designated colour schemes, making a colour correspond to each of the spots of the satellite. These colour schemes are used to describe the attribution of a plurality of frequency bands to the spots of the satellite with a view to radiofrequency transmissions to be realized in each of these spots. In these schemes, each colour corresponds to one of these frequency bands.

Multispot satellites also allow polarised transmissions to be emitted and received. The polarisation can be linear or circular. When the polarisation is linear, the two directions of polarisation are respectively horizontal and vertical. When the polarisation is circular, the two directions of polarisation are respectively circular left and circular right. In the particular example of FIG. 1, the uplink LM leaving the gateway 2 uses two polarisations with four slots for each polarisation, respectively Ch1 to Ch4 for the first polarisation and Ch5 to Ch8 for the second polarisation. The use of two polarisations allows the total number of gateways to be reduced. The eight slots Ch1 to Ch8, after processing by the payload of the multispot satellite 3, will form the eight spots SP1 to SP8, one slot being associated with one spot in the example of FIG. 1.

A common approach to provide a given capacity on a forward link FWD of a high throughput satellite (HTS) telecommunication system while minimizing the number of needed gateways of the HTS telecommunication system consists in increasing the uplink bandwidth per gateway. For example, Ka-Sat gateways were designed to uplink 1.25 GHz per polarization, using five slots of 250 MHz each. Other future Ka-band HTS gateways were designed to uplink 2.5 GHz per polarization in the 27.5 GHz-30 GHz Ka frequency band, corresponding to the maximum allowable bandwidth in the uplink of the forward link in Ka band.

To further reduce the number of gateways and/or increase the maximum delivered capacity of the HTS telecommunication system, another approach is now to move towards higher frequency bands, such as V band in the frequency range 40 GHz-75 GHz, and W band in the frequency range 75 GHz-110 GHz.

SUMMARY

An aspect of the invention provides an alternative method allowing the reduction of the number of gateways needed in a high throughput satellite telecommunication system, for a given total capacity on the forward link FWD, and without increasing the uplink bandwidth per gateway. The capacity of the forward link FWD is for example expressed in Gbit/s.

An aspect of the present invention addresses the technical problems identified above. In an embodiment of the invention, there is provided a method for establishing radiofrequency links via a telecommunication satellite having several spots, designated a multispot satellite, between at least one gateway and a service area comprising a plurality of elementary covering zones, designated cells, each cell being associated to a spot and comprising a plurality of terrestrial terminals, a forward link between the gateway towards the plurality of terrestrial terminals comprising:

a first step of uplink emission in which the gateway emits a first analog radiofrequency signal towards the multispot satellite, the first analog radiofrequency signal being emitted with a first spectral efficiency;

a second step in which a payload of the multispot satellite receives the first analog radiofrequency signal;

a third step in which the payload of the multispot satellite processes the first analog radiofrequency signal, the processing comprising:

a first sub-step of analog-to-digital conversion of the first analog radiofrequency signal in order to obtain a first digital radiofrequency signal, a second sub-step of demodulation and decoding of the first digital radiofrequency signal according to a first communication protocol in order to obtain extracted data, thanks to a first part of a digital unit of the payload, a third sub-step of coding and modulation of the extracted data according to a second communication protocol in order to obtain a second digital radiofrequency signal, thanks to a second part of the digital unit of the payload, a fourth sub-step of digital-to-analog conversion of the second digital radiofrequency signal in order to obtain a plurality of second analog radiofrequency signals, a fourth step of downlink emission in which the payload of the multispot satellite emits the plurality of second analog radiofrequency signals towards the cells, the plurality of second analog radiofrequency signals being emitted with a second spectral efficiency, the first spectral efficiency being greater than the second spectral efficiency.

Thanks to the second and third sub-steps of the method according to an aspect of the invention, there is provided:

a first point-to-point communication channel between the gateway and the payload of the multispot satellite, and a second point-to-multipoint communication channel between the payload of the multispot satellite and the plurality of terrestrial terminals, the first and second communication channels being independent of one another.

The second and third sub-steps use a digital unit that may also be referred to as a "regenerative unit".

Thanks to the first and second independent communication channels, the overall spectral efficiency of the forward link between the gateway and the plurality of terrestrial terminals is no longer limited by the weaker spectral efficiency among the uplink spectral efficiency between the gateway and the multispot satellite, and the downlink spectral efficiency between the multispot satellite and the plurality of terrestrial terminals. Benefiting from the first spectral efficiency, a given capacity on the first point-to-point communication channel may thus be reached with a reduced number of gateways and without increasing the needed bandwidth per gateway.

Apart from the characteristics mentioned above in the previous paragraph, the method according to an aspect of the invention may have one or several complementary characteristics among the following characteristics considered individually or in any technically possible combinations:

The method according to an aspect of the invention may comprise the following complementary characteristics:

in the first step, the gateway emits the first analog radiofrequency signal in a first frequency band;

before the third step, the payload down-converts the first analog radiofrequency signal from the first frequency band towards a second frequency band, the second frequency band being lower than the first frequency band;

before the fourth step, the payload up-converts the plurality of analog second radiofrequency signals from the second frequency band towards a third frequency band, the third frequency band being higher than the second frequency band.

The gateway may have a first frequency reference and the payload of the multispot satellite may have a second frequency reference, the first frequency reference being determined according to the second frequency reference, so that any frequency drift of the first radiofrequency signal during its transmission to the payload of the multispot satellite is anticipated by the gateway.

The second and third sub-steps of processing of the first digital radiofrequency signal may be provided by the digital unit of the payload of the multispot satellite following the principle of software defined radio SDR, so that the first and second communication protocols may be easily updated.

The first analog radiofrequency signal and the plurality of second analog radiofrequency signals may be in the Ka band.

The first spectral efficiency may be provided thanks to a first modulation/coding scheme of the first communication protocol and the second spectral efficiency may be provided thanks to a second modulation/coding scheme of the second communication protocol, the second modulation/coding scheme being different from the first modulation/coding scheme.

The first communication protocol may be the DVB-S2 protocol or the DVB-S2x protocol. The second communication protocol may be the DVB-S2 protocol or the DVB-S2x protocol. The first and second communication protocols may be identical. Alternatively, the first communication protocol may be different from the second communication protocol.

The method according to an aspect of the invention may comprise the following complementary characteristics:

in the first step, a plurality of gateways emits a plurality of first analog radiofrequency signals towards the multispot satellite, each first analog radiofrequency signal being emitted with the first spectral efficiency in the first frequency band;

in the second step, the payload of the multispot satellite receives the plurality of first analog radiofrequency signals;

before the third step, a plurality of down-converters of the payload down-converts the plurality of first analog radiofrequency signals from the first frequency band towards the second frequency band;

the gateway has a first frequency reference and the payload of the multispot satellite has a second frequency reference, each down-converter of the plurality and the first part of the digital unit being synchronized with the second frequency reference.

Additionally to the characteristics mentioned in the previous paragraph, the method according to an aspect of the invention may comprise the following complementary characteristics:

in the third step, the payload of the multispot satellite processes each first analog radiofrequency signal of the plurality of first analog radiofrequency signals in order to obtain, for each first analog radiofrequency signal, a plurality of second analog radiofrequency signals;

before the fourth step, a plurality of up-converters of the payload up-converts each plurality of second analog radiofrequency signals from the second frequency band to the third frequency band;

in the fourth step, the payload of the multispot satellite emits each plurality of analog second radiofrequency signals towards the cells, each plurality of analog second radiofrequency signals being emitted with the second spectral efficiency.

The second frequency reference of the payload of the multispot satellite may be provided by one on-board local oscillator.

In an embodiment, there is also provided a payload of a telecommunication satellite having several spots, designated a multispot satellite, comprising components to perform the method described herein.

Other features and benefits of the invention will become apparent on examining the detailed specifications hereafter and the appended drawings.

BRIEF DESCRIPTION OF THE FIGURES

FIG. 1 schematically illustrates a forward link in a multispot configuration of a high throughput satellite telecommunication system.

FIG. 2 shows the performances of a DVB-S2 communication protocol and of a DVB-S2x communication protocol, as compared to the Shannon limit.

DETAILED DESCRIPTION

Some embodiments of apparatus and methods in accordance with embodiments of the present invention are now described, by way of example only, and with reference to the accompanying drawings. The description is to be regarded as illustrative in nature and not as restricted.

The capacity, for example expressed in Gbit/s, of a given frequency bandwidth is limited according to the Shannon theorem. The Shannon theorem provides an indication of how many bits per second (bps) of information can be carried per hertz of the frequency bandwidth, according to the ratio R=C/(N+I) where:

C is the power of transmitted bits,
N is the integrated thermal noise,
I is the interference power.

The ratio R may also be reported as the signal-to-noise ratio S/N or SNR, or as the signal-to-noise-plus-interference ratio SNIR. The ratio R is generally used in all kind of communication protocols.

FIG. 2 shows:
a first curve C_Sh of the spectral efficiency at the Shannon limit according to the ratio R expressed in dB;
a second curve C_DVB-S2 of the spectral efficiency of a DVB-S2 communication protocol according to the ratio R expressed in dB; and
a third curve C_DVB-S2x of the spectral efficiency of a DVB-S2x communication protocol according to the ratio R expressed in dB.

The third curve C_DVB-S2x shows that the DVB-S2x communication protocol provides additional granularity and improved bandwidth occupation, in comparison with the DVB-S2 communication protocol of the second curve C_DVB-S2. The roll-off of the third curve C_DVB-S2x is indeed reduced to 5%, instead of the 20% for the roll-off of the second curve C_DVB-S2. FIG. 2 thus illustrates that moving towards increasing ratio R allows processing more and more bits per second in a given bandwidth.

The throughput, for example expressed in bits per second bps, is limited by the following first inequation:

$$\text{throughput} < B_w \cdot \log_2(1+R)$$

where $B_w$ is the bandwidth, for example expressed in herz Hz, and R the ratio previously defined as R =C/(N+I).

Another way to express the previous inequation is the following second inequation:

$$\eta < \log_2(1+R)$$

where η is the spectral efficiency expressed in bps/Hz.

For high values of the ratio R, the second inequation can be simplified by the following third inequation:

$$\eta < \frac{1}{3} \cdot R_{dB}$$

The spectral efficiency η thus improves with the increase of the ratio R.

Figure 3:
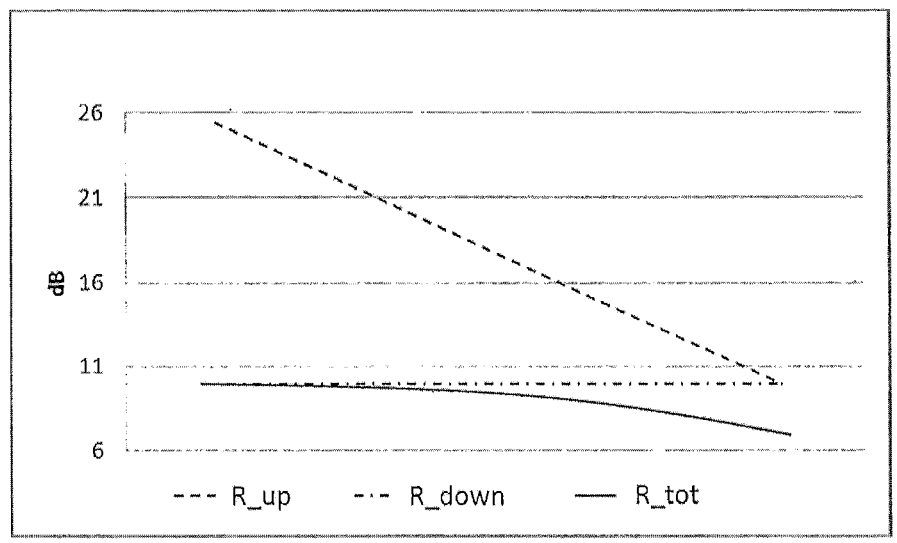
FIG. 3 shows the evolution of the overall performance of a HTS telecommunication channel comprising an uplink path and a downlink path, according to the performances of the uplink and downlink paths.

FIG. 3 illustrates the evolution of the total ratio R_tot of a HTS ("High Throughput Satellite") telecommunication channel comprising an uplink having a ratio R_up and a downlink having a ratio R_down. The total ratio R_tot can be expressed according to the uplink ratio R_up and the downlink ratio R_down:

$$R_{tot} = \left[ \frac{1}{R\_up} + \frac{1}{R\_down} \right]^{-1}$$

According to the previous equation, when R_down<<R_up, the total ratio R_tot may be approximated by the downlink ratio R_down. In the same way, when R_up<<R_down, the total ratio R_tot may be approximated by the uplink ratio R_up. This means that the overall performance of the telecommunication channel is dominated by the worst link. FIG. 3 shows indeed that, given a constant downlink ratio R_down of 10 dB, an uplink ratio R_up exceeding 25 dB only enables the total ratio R_tot to be equal to R_down. An uplink ratio R_up equal to the downlink ratio R_down determines a global degradation of 3 dB for the total ratio R_tot.

As a general engineering practice, the uplink ratio R_up is designed to be the highest possible so that the total ratio R_tot is only driven by the downlink ratio R_down. It is for example common to design an uplink ratio R_up exceeding 20 dB while the downlink ratio R_down stays in the range 10 dB-13 dB. In the particular example of the Ka-Sat mission, the uplink ratio exceeds 25 dB while the downlink ratio is in the range 12 dB-15 dB, allowing a total ratio in the range 11.5 dB-14 dB.

Figure 4:
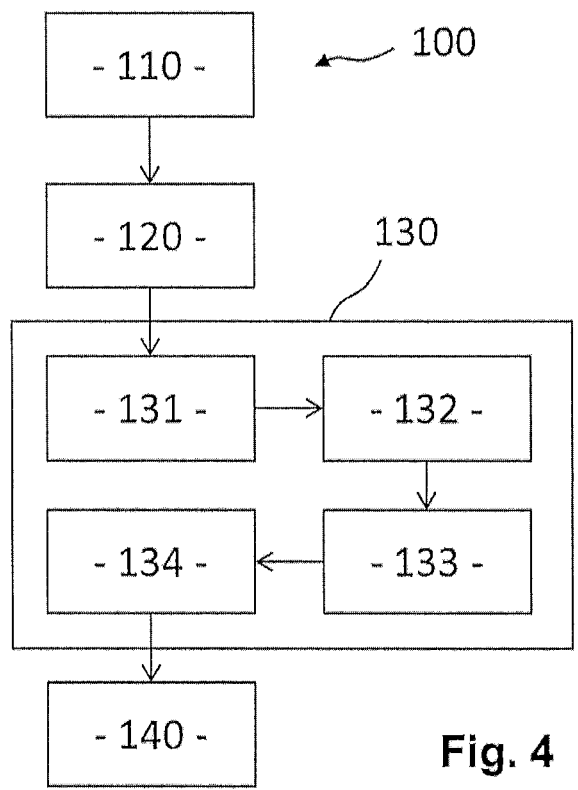
FIG. 4 is a diagram of different steps and sub-steps of a method for establishing radiofrequency in a high throughput satellite telecommunication system, according to an aspect of the invention.
Figure 5:
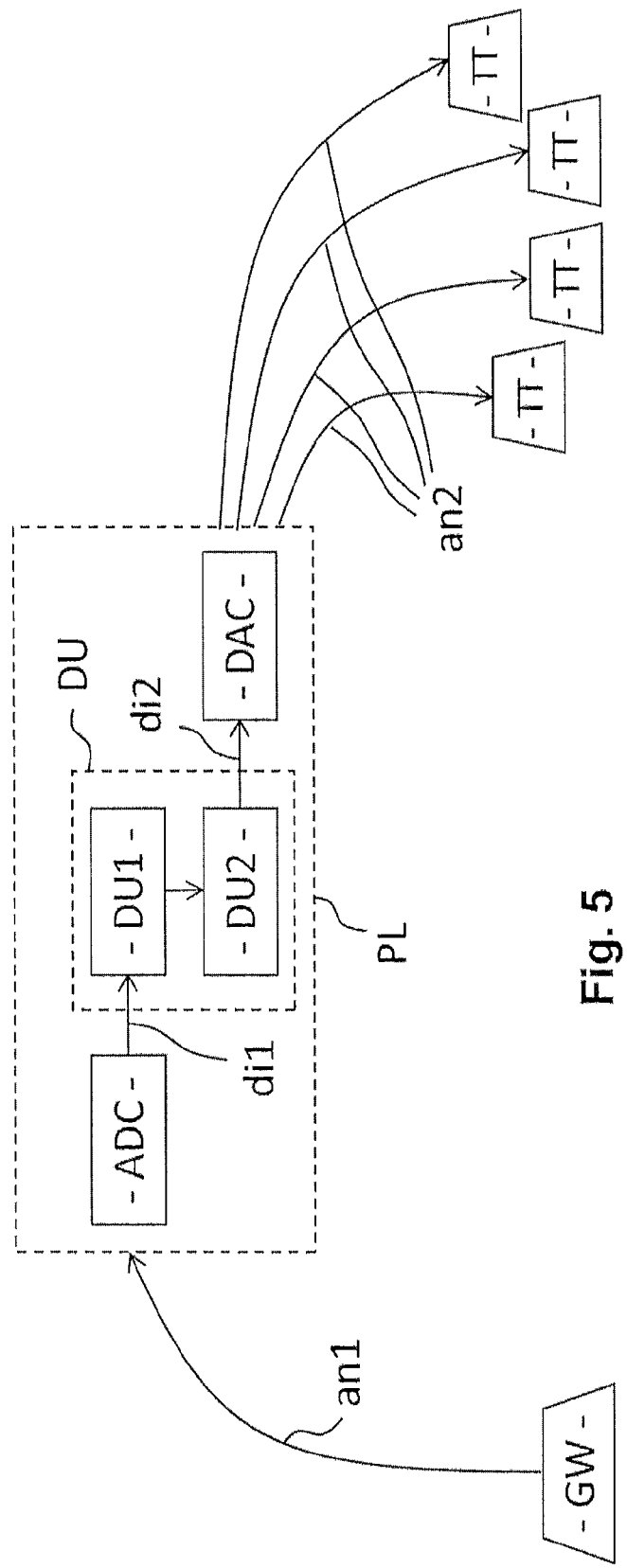
FIG. 5 schematically illustrates a telecommunication system performing the method of FIG. 4.

FIG. 4 is a diagram of different steps and sub-steps of a method 100 according to an aspect of the invention. FIG. 5 schematically illustrates a telecommunication system 200 able to perform the method 100 according to an aspect of the invention.

The telecommunication system 200 comprises:
- at least one gateway GW,
- a telecommunication satellite having several spots, designated a multispot satellite, and
- a plurality of terrestrial terminals TT.

Each spot of the multispot satellite covers an elementary covering zone, designated a cell, of a service area. Each cell is associated to a spot of the multispot satellite. Each cell comprises several terrestrial terminals TT. The multispot satellite has a payload PL comprising:
- an analog-to-digital converter ADC,
- a digital unit DU comprising a first part DU1 and a second part DU2,
- a digital-to-analog converter DAC.

The payload PL also typically comprises at least one reception antenna and at least one transmission antenna, or at least one antenna having both reception and transmission functions.

The method 100 is for establishing radiofrequency links via the multispot satellite, between the at least one gateway GW and the service area previously described. FIG. 4 more particularly shows different steps and sub-steps of a forward link between the gateway GW towards the plurality of terrestrial terminals TT of the service area. The method 100 thus comprises:
- a first step 110 of uplink emission in which the gateway GW emits a first analog radiofrequency signal an1 towards the multispot satellite, the first analog radiofrequency signal an1 being emitted with a first spectral efficiency η1;
- a second step 120 in which the payload PL of the multispot satellite receives the first analog radiofrequency signal an1;
- a third step 130 in which the payload PL of the multispot satellite processes the first analog radiofrequency signal an1, the processing comprising:
  - a first sub-step 131 of analog-to-digital conversion of the first analog radiofrequency signal an1 in order to obtain a first digital radiofrequency signal di1 thanks to the analog-to-digital converter ADC of the payload PL,
  - a second sub-step 132 of demodulation and decoding of the first digital radiofrequency signal di1 according to a first communication protocol in order to obtain extracted data, thanks to the first part DU1 of the digital unit DU of the payload PL,
  - a third sub-step 133 of coding and modulation of the extracted data according to a second communication protocol in order to obtain a second digital radiofrequency signal di2 thanks to the second part DU2 of the digital unit DU of the payload PL,
  - a fourth sub-step 134 of digital-to-analog conversion of the second digital radiofrequency signal di2 in order to obtain a plurality of second analog radiofrequency signals an2, thanks to the digital-to-analog converter DAC of the payload PL,
- a fourth step 140 of downlink emission in which the payload PL of the multispot satellite emits the plurality of second analog radiofrequency signals an2 towards the cells, the plurality of second analog radiofrequency signals an2 being emitted with a second spectral efficiency η2, the first spectral efficiency η1 being greater than the second spectral efficiency η2.

The analog-to-digital converter ADC, the digital unit DU and the digital-to-analog converter DAC provides a regenerative unit of the payload PL, which performs:
- a first point-to-point communication between each gateway GW and the multispot satellite, and
- a second point-to-multipoint communication between the multispot satellite and the plurality of terrestrial terminals TT.

As a consequence, there is no longer an uplink path and a downlink path of a same telecommunication channel, but two distinct communication channels:
- the first communication channel with the first spectral efficiency η1, and
- the second communication channel with the second spectral efficiency η2.

The multispot satellite no longer acts as a simple relay. The overall performance of the forward link between each gateway GW and the plurality of terrestrial terminals TT is therefore not dominated by the worst link between the first communication channel and the second communication channel. The performance of the first communication channel is independent of the performance of the second communication channel.

The regenerative unit of the payload PL thus allows to improve the first spectral efficiency η1 on the first communication channel and to actually benefit from the improved first spectral efficiency η1, instead of "losing" it because of a potentially weaker second spectral efficiency η2 on the second communication channel. The method 100 according to an aspect of the invention therefore allows providing a given capacity or throughput on the first communication channel with a reduced number of gateways GW and without increasing the bandwidth of each gateway GW.

Taking a particular example of an HTS mission according to the state of the art, the spectral efficiency:
- ranges between 3.9 bps/Hz and 4.7 bps/Hz at the theoretical Shannon limit,
- ranges between 2.6 bps/Hz and 3.4 bps/Hz with actual modulation/coding schemes of communication protocols such as DVB-S2,
- is actually less than 2.3 bps/Hz taking into account additional implementation losses such as downlink fading, DVB-S2 receiver implementation loss, etc.

The HIS mission according to the state of the art uses eight gateways GW. Each HIS gateway is designed to uplink 1.25 GHz per polarization, using five slots of 250 MHz each. Each HTS gateway uses two polarizations and therefore has an uplink bandwidth of 2.5 GHz. The total bandwidth of the eight gateways GW is thus of 20 GHz.

The capacity of the HIS mission according to the state of the art is thus less than:

$$2.3 \times 20 = 46 \text{ Gbps}$$

Now using the method 100 according to an aspect of the invention, let us assume a ratio R, as previously defined, of 20 dB on the first communication channel. The first spectral efficiency η1 of the first communication channel will now be of 4.45 bps/Hz with a 32APSK 9/10 modulation/coding scheme of a DVB-S2 communication protocol, or even greater than 5 bps/Hz with another modulation/coding scheme of a DVB-S2x communication protocol, such as for example:
- a 64APSK 11/15 modulation/coding scheme,
- a 128APSK 11/15 modulation/coding scheme,
- a 256APSK 11/15 modulation/coding scheme.

Assuming thus a first spectral efficiency of 5 bps/Hz, the needed bandwidth to achieve a capacity of 46 Gbps is only of 9.2 GHz, meaning that the number of gateways GW may be divided by two.

The method 100 according to an aspect of the invention thus allows a cost optimization of a HTS telecommunication system by decreasing the number of gateways GW needed to provide a given capacity. An increased complexity of the payload of the multispot satellite allows reducing the number of needed gateways GW and therefore reducing the overall system cost.

The gateway GW typically has a first frequency reference and the payload PL of the multispot satellite typically has a second frequency reference. The first frequency reference is beneficially determined according to the second frequency reference, so that any frequency drift of the first radiofrequency signal an1 during its transmission to the payload PL of the multispot satellite is anticipated by the gateway GW. Each gateway GW being able to adapt its first frequency reference according to the second frequency reference of the payload PL, the payload PL no longer need to be equipped with a tracking system of the first frequency reference.

The first communication protocol, used on the first communication channel, may typically be the DVB-S2 protocol or the DVB-S2x protocol. The second communication protocol, used on the second communication channel, may also be the DVB-S2 protocol or the DVB-S2x protocol. The first and second communication protocols may be identical. Alternatively, the second communication protocol may be different from the first communication protocol.

The second and third sub-steps 132, 133 of processing of the first digital radiofrequency signal di1 are beneficially provided by the digital unit DU of the payload PL following the principle of software defined radio SDR, so that the first and second communication protocols may be updated. The decoding part of the second sub-step 132 and/or the coding part of the third sub-step 133 may be easily updated in a first time. The demodulation part of the second sub-step 132 and/or the modulation part of the third sub-step 133 may then also be updated in a second time.

In other words, the digital unit DU allows updating the first and second communication protocols in orbit, thus benefiting of potential evolutions and improvements of the communication protocols while letting the multispot satellite in orbit.

The first spectral efficiency $\eta 1$ is typically provided thanks to a first modulation/coding scheme of the first communication protocol and the second spectral efficiency $\eta 2$ is typically provided thanks to a second modulation/coding scheme of the second communication protocol, the second modulation/coding scheme being different from the first modulation/coding scheme. For a 32APSK 9/10 first modulation/coding scheme, the second modulation/coding scheme may for example be a 8PSK 9/10 modulation/coding scheme.

The first analog radiofrequency signal an1 and the plurality of second analog radiofrequency signals an2 are typically in the Ka band. The Ka band has been previously described. Alternatively, the first analog radiofrequency signal an1 and the plurality of second analog radiofrequency signals an2 may be in the Ku band, or in the V band, or in the W band.

The first analog radiofrequency signal an1 is typically emitted in a first frequency band, and the plurality of second analog radiofrequency signals an2 is typically emitted in a third frequency band. In the case where the first analog radiofrequency signal an1 and the plurality of second analog radiofrequency signals an2 are in the Ka band, the first frequency band and the third frequency band are thus comprised in the Ka band. The analog-to-digital converter ADC and the digital-to-analog converter DAC typically have an operating frequency that is comprised in a second frequency band, the second frequency band being lower than the first and third frequency bands.

Therefore the method 100 according to an aspect of the invention beneficially comprises the following steps:
- before the third step 130, the payload PL down-converts the first analog radiofrequency signal an2 from the first frequency band towards the second frequency band;
- before the fourth step 140, the payload PL up-converts the plurality of analog second radiofrequency signals an2 from the second frequency band towards the third frequency band.

In the case where the HTS telecommunication system comprises a plurality of gateways GW, the steps and substeps of the method 100 according to an aspect of the invention are typically adapted in the following manner:
- in the first step 110, the plurality of gateways GW emits a plurality of first analog radiofrequency signals an1 towards the multispot satellite, each first analog radiofrequency signal being emitted with the first spectral efficiency in the first frequency band;
- in the second step 120, the payload PL of the multispot satellite receives the plurality of first analog radiofrequency signals an1, typically thanks to a plurality of reception antennas of the payload, each reception antenna being associated with a gateway GW and receiving the first analog radiofrequency signal an1 emitted by the gateway GW with which it is associated;
- before the third step 130, a plurality of down-converters of the payload PL down-converts the plurality of first analog radiofrequency signals an1 from the first frequency band towards the second frequency band;
- in the third step 130, the payload PL of the multispot satellite processes each first analog radiofrequency signal an1 of the plurality of first analog radiofrequency signals in order to obtain, for each first analog radiofrequency signal, a plurality of second analog radiofrequency signals an2;
- before the fourth step 140, a plurality of up-converters of the payload PL up-converts each plurality of second analog radiofrequency signals an2 from the second frequency band to the third frequency band;
- in the fourth step 140, the payload PL of the multispot satellite emits each plurality of analog second radiofrequency signals an2 towards the cells, each plurality of analog second radiofrequency signals being emitted with the second spectral efficiency.

Each down-converter of the plurality and the first part DU1 of the digital unit DU are beneficially synchronized with the second frequency reference of the payload PL of the multispot satellite. The second frequency reference of the payload PL of the multispot satellite is beneficially provided by one on-board local oscillator. Each down-converter obtains its own frequency reference from the second frequency reference of the payload PL thanks to a phase-locked loop PLL. Each down-converter therefore typically has its own phase-locked loop PLL.

The invention claimed is:

1. A method for establishing radio frequency links via a multispot telecommunication satellite having several spots between at least one gateway and a service area comprising a plurality of elementary covering zones, designated cells, each cell being associated to a spot and comprising a plurality of terrestrial terminals, said method comprising establishing a forward link between the gateway towards the plurality of terrestrial terminals that comprises:
   a first step of uplink emission in which the gateway emits a first analog radio frequency signal towards the multispot satellite, said first analog radio frequency signal being emitted with a first spectral efficiency;
   a second step in which a payload of the multispot satellite receives the first analog radio frequency signal;
   a third step in which the payload of the multispot satellite processes the first analog radio frequency signal, said multispot satellite processing comprising:
      a first sub-step of analog-to-digital conversion of said first analog radio frequency signal in order to obtain a first digital radio frequency signal,
      a second sub-step of demodulation and decoding of the first digital radio frequency signal according to a first communication protocol in order to obtain extracted data, the second sub-step being carried out by a first part of a digital unit of the payload,
      a third sub-step of coding and modulation of said extracted data according to a second communication protocol in order to obtain a second digital radio frequency signal, the third sub-step being carried out by a second part of the digital unit of the payload,
      a fourth sub-step of digital-to-analog conversion of said second digital radio frequency signal in order to obtain a plurality of second analog radio frequency signals,
   a fourth step of downlink emission in which the payload of the multispot satellite emits said plurality of second analog radio frequency signals towards cells, said plurality of second analog radio frequency signals being emitted with a second spectral efficiency, the first spectral efficiency being greater than the second spectral efficiency.

2. The method according to claim 1 wherein:
   in the first step, the gateway emits the first analog radio frequency signal in a first frequency band;
   before the third step, the payload down-converts the first analog radio frequency signal from the first frequency band towards a second frequency band, the second frequency band being lower than the first frequency band;
   before the fourth step, the payload up-converts the plurality of analog second radio frequency signals from the second frequency band towards a third frequency band, the third frequency band being higher than the second frequency band.

3. The method according to claim 1, wherein the gateway has a first frequency reference and the payload of the multispot satellite has a second frequency reference, the first frequency reference being determined according to the second frequency reference, so that any frequency drift of the first radio frequency signal during its transmission to the payload of the multispot satellite is anticipated by the gateway.

4. The method according to claim 3, wherein the second frequency reference of the payload of the multispot satellite is provided by one on-board local oscillator.

5. The method according to claim 1, wherein the second and third sub-steps of processing of the first digital radio frequency signal are provided by the digital unit of the payload of the multispot satellite following the principle of software defined radio SDR, so that the first and second communication protocols are updatable.

6. The method according to claim 1, wherein the first analog radio frequency signal and the plurality of second analog radio frequency signals are in the Ka band.

7. The method according to claim 1, wherein the first spectral efficiency is provided by a first modulation/coding scheme of the first communication protocol and the second spectral efficiency is provided by a modulation/coding scheme being different from the first modulation/coding scheme.

8. The method according to claim 1, wherein the first communication protocol and/or the second communication protocol are/is the DVB-S2 protocol or the DVB-S2x protocol.

9. The method according to claim 1, wherein:
   in the first step, a plurality of gateways emits a plurality of first analog radio frequency signals towards the multispot satellite, each first analog radio frequency signal being emitted with the first spectral efficiency in the first frequency band;
   in the second step, the payload of the multispot satellite receives the plurality of first analog radio frequency signals;
   before the third step, a plurality of down-converters of the payload down-converts the plurality of first analog radio frequency signals from the first frequency band towards the second frequency band;
   the gateway has a first frequency reference and the payload of the multispot satellite has a second frequency reference, each down-converter of said plurality and the first part of the digital unit being synchronized with the second frequency reference.

10. The method according to claim 9, wherein:
   in the third step, the payload of the multispot satellite processes each first analog radio frequency signal of the plurality of first analog radio frequency signals in order to obtain, for each first analog radio frequency signal, a plurality of second analog radio frequency signals;
   before the fourth step, a plurality of up-converters of the payload up-converts each plurality of second analog radio frequency signals from the second frequency band to the third frequency band;
   in the fourth step, the payload Of the multispot satellite emits each plurality of analog second radio frequency signals towards said cells, each plurality of analog second radio frequency signals being emitted with the second spectral efficiency.

11. A payload of a telecommunication satellite having several spots, designated a multispot satellite, comprising components to perform the method according to claim 1.

* * * * *